United States Patent
Hüppi et al.

(10) Patent No.: US 6,701,694 B2
(45) Date of Patent: Mar. 9, 2004

(54) METHOD AND APPARATUS FOR FORMING ITEM GROUPS

(75) Inventors: Emil Hüppi, Uhwiesen (CH); Armin Klotz, Bräunlingen (DE)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/866,583

(22) Filed: May 30, 2001

(65) Prior Publication Data

US 2001/0049923 A1 Dec. 13, 2001

(30) Foreign Application Priority Data

May 31, 2000 (CH) ..................................... 2000 1097/00

(51) Int. Cl.[7] ............................................. B65B 35/30
(52) U.S. Cl. .............................. 53/443; 53/251; 53/540
(58) Field of Search ........................ 53/473, 446, 235, 53/475, 544, 500, 243, 244, 250, 251, 443, 537, 540, 447

(56) References Cited

U.S. PATENT DOCUMENTS

| | | | | |
|---|---|---|---|---|
| 1,243,406 A | * | 10/1917 | Hawthorne | 53/539 |
| 3,425,184 A | * | 2/1969 | Heliot | 53/501 |
| 3,691,717 A | * | 9/1972 | Pirro | 53/473 |
| 4,189,898 A | * | 2/1980 | Moulds et al. | 53/446 |
| 4,203,274 A | * | 5/1980 | Warkentin et al. | 53/537 |
| 4,428,175 A | * | 1/1984 | Haab | 53/55 |
| 4,750,315 A | * | 6/1988 | Wadell | 53/475 |
| 4,955,929 A | * | 9/1990 | Klapp | 53/244 |
| 5,025,612 A | * | 6/1991 | Monsees | 53/530 |
| 5,186,599 A | | 2/1993 | Fluck | |
| 5,251,422 A | * | 10/1993 | Goodman et al. | 53/251 |
| 5,256,029 A | | 10/1993 | Fluck | |
| 5,502,945 A | * | 4/1996 | Schonbohm | 53/247 |
| 5,588,285 A | * | 12/1996 | Odenthal | 53/534 |
| 5,655,355 A | * | 8/1997 | Ramler | 53/475 |
| 5,855,105 A | * | 1/1999 | Ferris | 53/475 |
| 6,370,844 B1 | * | 4/2002 | Stricker | 53/446 |

FOREIGN PATENT DOCUMENTS

| | | |
|---|---|---|
| EP | 0 250 470 | 7/1991 |
| EP | 0 453 407 A1 | 10/1991 |
| EP | 0 526 403 A1 | 2/1993 |
| FR | 2 501 624 | 9/1982 |
| WO | WO 01/02250 A1 | 1/2001 |

* cited by examiner

*Primary Examiner*—Rinaldi I. Rada
*Assistant Examiner*—John Paradiso
(74) *Attorney, Agent, or Firm*—Venable LLP; Robert Kinberg; Jung H. Kim

(57) ABSTRACT

An apparatus for forming an item group in a container, includes a first conveyor carrying the items; a second conveyor; and a plurality of container carriers mounted on the second conveyor. Each container carrier has a support for holding and positioning a container such that a container bottom and a container side wall are oriented obliquely to the advancing direction of the second conveyor. A pickup device lifts an item from the first conveyor, transports it to the second conveyor and deposits it into a container positioned by a container carrier. A control device controls the motions of the pickup device to selectively deposit items in a flat-lying orientation on the container bottom or on the container side wall. After uprighting the containers subsequent to their charging with items, each item is either in a flat-lying orientation or in an edge-wise standing orientation with respect to the container bottom.

12 Claims, 5 Drawing Sheets

METHOD AND APPARATUS FOR FORMING ITEM GROUPS

CROSS REFERENCE TO RELATED APPLICATION

This application claims the priority of Swiss Application No. 2000 1097/00 filed May 31, 2000, which is incorporated herein by reference.

BACKGROUND OF THE INVENTION

This invention relates to a method and an apparatus for forming item groups in a container.

Various apparatus and methods of the above type are known. Thus, European Patent No. 0 526 403 describes a method and an apparatus for forming groups of edible wafers which are conveyed to the grouping apparatus on a conveyor belt in a random sequence. FIG. 2 of the patent shows a gripper device which lifts an edible wafer from a carrier, swings it in a tilted orientation and deposits the wafer in a container in such a manner that the wafers are in an edge-wise standing position, that is, their principal plane is essentially perpendicular to the container bottom.

European Patent No. 0 453 407 to which corresponds U.S. Pat. No. 5,186,599 describes a further method and apparatus for forming groups of edible wafers in which, as seen in FIG. 3 of that patent, the wafers are arranged in a lying position in a container, that is, their principal plane is oriented essentially parallel to the container bottom.

It is a disadvantage of the prior art arrangements that two different devices are required to arrange the items, particularly wafer-shaped food products, in a standing or in a flat-lying condition.

SUMMARY OF THE INVENTION

It is an object of the invention to provide an improved method and apparatus of the above-outlined type by means of which containers may be selectively charged with items, such as edible wafers, in a standing and/or in a flat-lying position relative to the container bottom.

This object and others to become apparent as the specification progresses, are accomplished by the invention, according to which, briefly stated, the apparatus for forming a group of items in a container includes a first conveyor for advancing items positioned thereon; a second conveyor; and a plurality of container carriers mounted on the second conveyor. Each container carrier has a support for holding and positioning a container such that a container bottom and a container side wall are oriented at an inclined angle to the advancing direction of the second conveyor. A pickup device lifts an item from the first conveyor, transports the item to the second conveyor and deposits the item into a container held and positioned by a container carrier. A control device controls the motions of the pickup device to selectively deposit items in a flat-lying orientation either on a container bottom or on a container side wall. After uprighting the containers subsequent to their charging with items, each item in each container is either in a flat-lying orientation or in an edge-wise standing orientation with respect to the container bottom.

The method according to the invention comprises the steps of grasping the items by means of a gripper device and by depositing the grasped items in containers positioned in a conveying device. By setting the gripper device into a first or into a second mode, the items are deposited in the containers in a flat-lying position either on the bottom or on a side wall of an obliquely positioned container, so that after uprighting the container, an item therein will be either in a flat-lying or in an edge-wise standing orientation relative to the container bottom.

The above-outlined combination according to the invention allows a large degree of flexibility of the packing station. Various product configurations may be realized in the container in a simple manner. Even different items, particularly items of different external shape may be deposited in the containers. The charging of the containers may be effected rapidly and securely. By virtue of the multi-functionality of the apparatus a high output rate of the machine may be achieved.

The desired configuration of the item group is formed directly in the containers. An intermediate station which has been required in prior art arrangements between the first (standing or flat-lying) and the second (flat-lying or standing) stacking mode increases the spatial requirement of the entire apparatus and also, adversely affects its output rate. The oblique positioning may be made possible in two directions or continuously. The suction member may be self-deforming or may be mechanically controlled.

BRIEF DESCRIPTION OF THE DRAWINGS

FIGS. 4a–7a show schematic sectional side elevational views of containers with four different arrangements of items therein.

FIGS. 4b–7b are respective top plan views of the configurations shown in FIGS. 4a–7a.

DESCRIPTION OF THE PREFERRED EMBODIMENT

Figure 1:
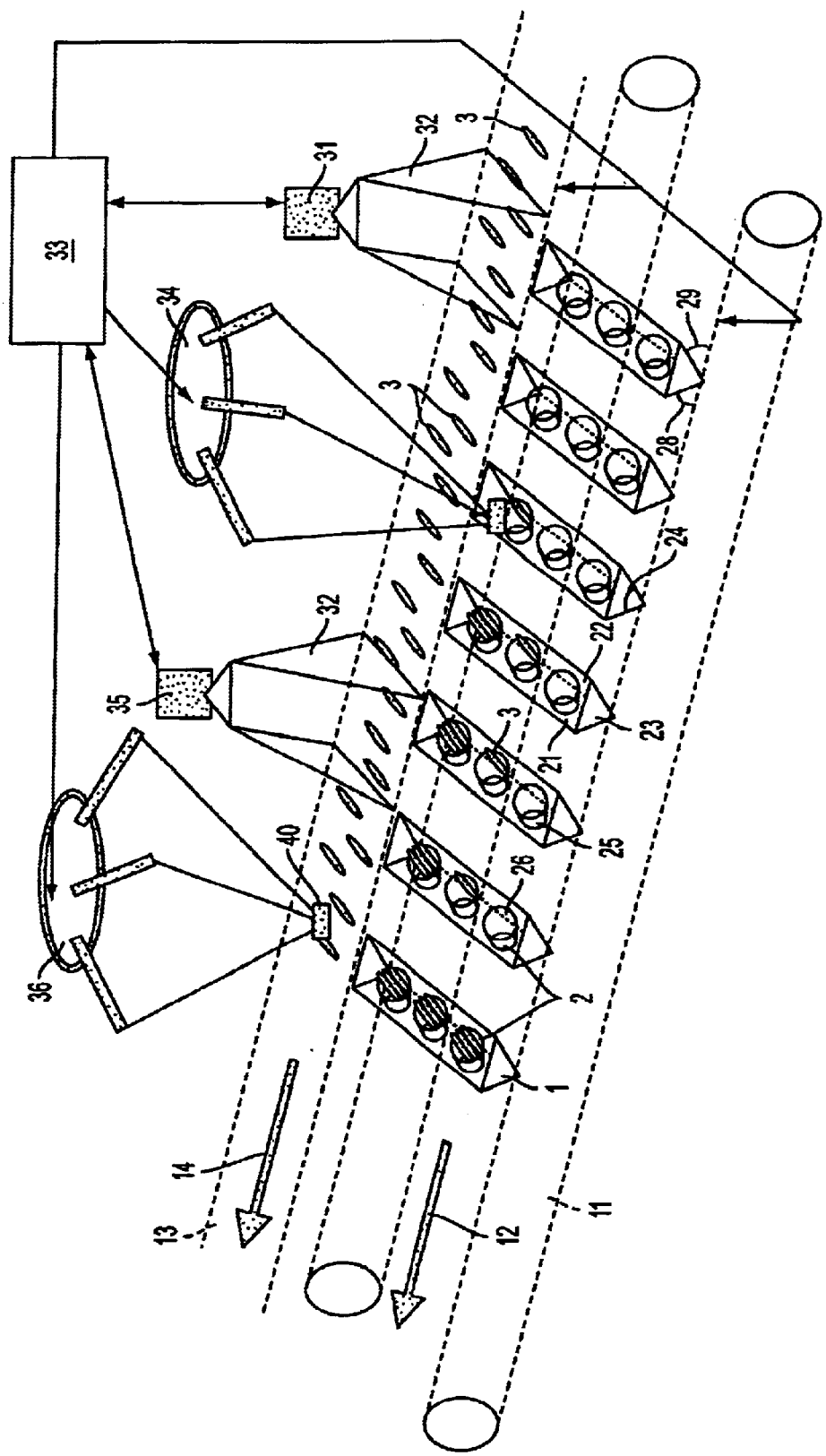
FIG. 1 is a schematic perspective view of an apparatus according to the invention.

FIG. 1 schematically shows an apparatus according to the invention, including container carriers 1. The container carriers 1 are mounted on parallel-running conveyor belts 11 which move in the direction of the arrow 12.

The container carriers 1, into which the containers 2 may be inserted, have two walls 21 and 22 whose length extends transversely to the advancing direction 12 and which may be open at opposite ends or closed, as shown, by end walls 23. The walls 21 and 22 are arranged at an angle of about 90° to one another. The containers 2 are positioned, with their bottom wall 25, on the wall 21 facing the advancing direction 12. As it will be seen later in conjunction with other figures, the containers 2 may also be positioned on the wall 22 of the container carrier 1. The side walls 26 of the containers 2 are supported unilaterally on the wall 22.

As shown in FIG. 1, three containers 2 are arranged side-by-side in each container carrier 1. Non-illustrated lateral abutments may be provided in the carriers 1 for positioning and fixing the containers 2 in the prismatic carriers 1.

Parallel to the conveyor belt 11 a further conveyor belt 13 is arranged which moves in the direction of the arrow 14, thus, as seen, parallel and codirectionally with the conveyor belt 11. It is, however, also feasible to move the conveyor belts 11 and 13 in opposite directions. On the conveyor belt 13 individual items such as confectionery wafers 3 are arranged in an organized or in a random manner. The flat edible wafers may be elongated, round, polygonal, oval or may have complex geometrical shapes wherein advantageously two dimensions of the edible wafer, such as width and height, significantly differ from one another.

The position and orientation of the items 3 on the conveyor 13 are sensed by a first optical sensor 31, such as an imaging camera, having a conical detecting range 32. Signals representing the positional conditions of the items are applied by the sensor 31 to a control device 33. The control device 33 controls a first pickup device 34 which grasps and lifts predetermined items 3 from the conveyor belt 13 and deposits them into a container 2. In FIG. 1 some containers 2 are fully charged with three items, while others are only partially filled even after they have left the operating range of the first pickup device 34. For this reason a second optical sensor 35 (also having a conical detecting range 32) and a second pickup device 36 are provided which are likewise controlled by the control device 33 and which complete the charging of the containers 2. It is to be understood that more than two pickup devices 34, 36 may be provided, or only a single sensor 31 is used and that, for example, wider or more conveyor belts 13 are provided, for example, bilaterally of the conveyor belt 11.

At each pickup station 34 and 36 a gripper 40 is provided which will be described in more detail in conjunction with FIG. 8. The pickup device 34 or 36 shown in FIG. 1 is constructed as described in European Patent 0 250 470; it may, however, be replaced by any other pickup device with which edible wafers may be lifted from a first conveyor and moved to a second conveyor.

Figure 2:
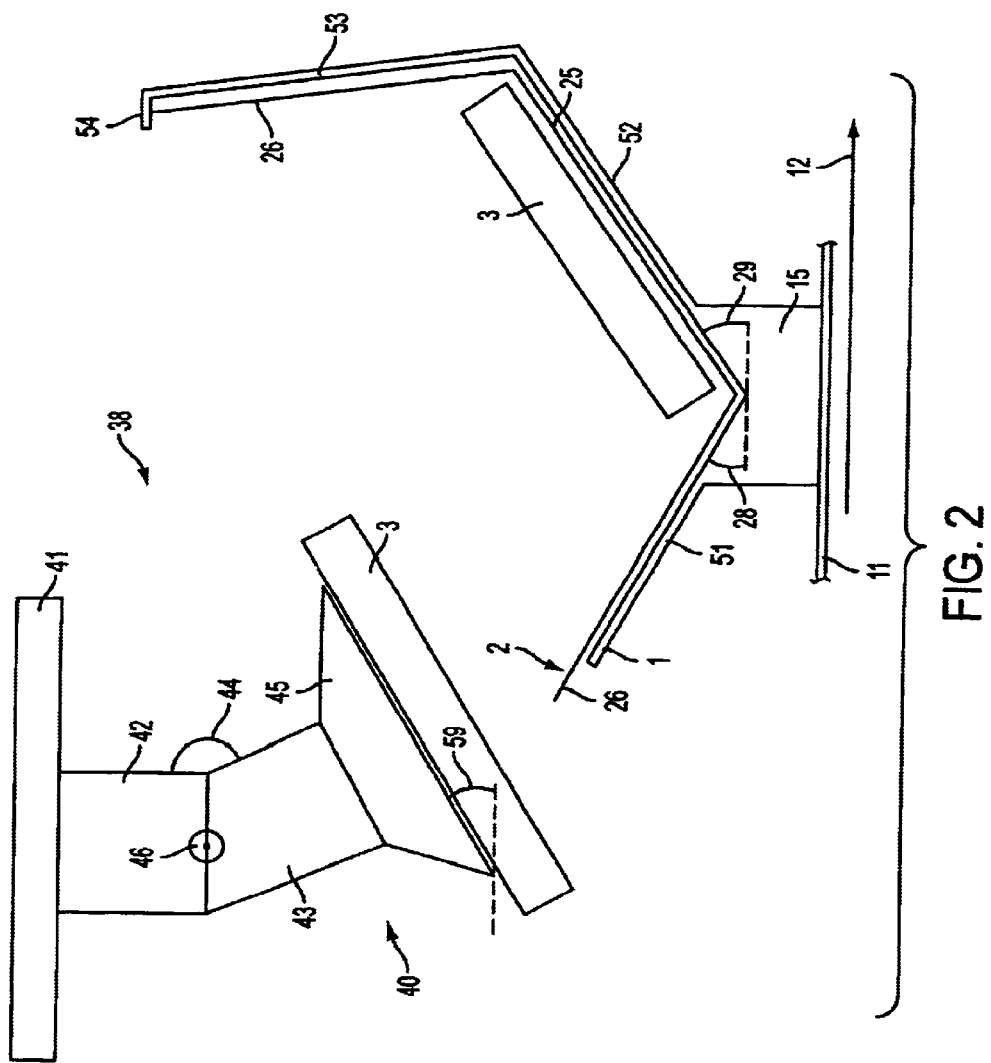
FIG. 2 is a schematic side elevational view of a gripper and a container carrier according to the invention in a first mode for a flat-lying deposition of items on a container bottom.

FIG. 2 schematically shows a gripper 40 for use with a container carrier 1 according to the invention. The gripper 40 is in a first mode for depositing an edible wafer 3 into the container 2 in a flat-lying orientation relative to the container bottom. The container carrier 1 shown in FIG. 2 is of more complex configuration than that shown in FIG. 1; identical features in all figures are provided with the same reference characters.

The container carrier 1 illustrated in FIG. 2 is affixed to at least one connecting support 15 mounted on the conveyor belt 11 moving in the direction of the arrow 12. The container carrier 1 is, as viewed in cross section, composed of four polygonally arranged sides 51, 52, 53 and 54. The side 52 supports the bottom 25 of the container 2, whereas the sides 51 and 53 support the two side walls 26 of the container 2. The sides 51 and 52 are inclined at respective angles 28 and 29 which may be, for example, −45° and +45°, respectively, to the advancing direction 12.

It is to be understood that by the sides 51, 52 and 53 of the container holder 1 components are also meant which are constituted by a grid construction and/or which have only individual noses or strips with which the containers 2 are held and positioned with respect to the advancing direction 12 at angles 28, 29 as shown in FIG. 2.

In the illustrated embodiment the container 2 is a rotational body, for example, a frustoconical, deformable paper container. The short lateral edge 54 of the side 53 constitutes an abutment for the upper edge of the higher-lying side wall 26. Advantageously, lateral abutments are also provided to prevent the container 2 from lateral shifting.

The gripper 40 is secured to a socket plate (a holding base) 41 of the pickup device 34. The gripper 40 has a first arm 42 and a second arm 43 coupled to one another end-to-end by a joint 46 by means of which the angle 44 between the two arms 42 and 43 may be varied, for example, between 90° and 270°. In FIG. 2 the gripper 40 is shown in a position 38 in which the angle 44 is approximately 150°. The arm 43 is moved from such 150° position counterclockwise (as viewed in FIG. 2) to assume an angle of 135° with respect to the arm 42 for positioning an item 3, lifted by the suction head 45, in a flat-lying orientation on the bottom 25 of the container 2. The frontal end of the gripper 40 thus has an angle 59 of, for example, 45° to the horizontal. Instead of a suction head 45, any other type of grasping device may be used, as long as it is pivotal about an axis which is perpendicular to the direction of advance 12 and transverse to the conveyor belts 11. It is additionally advantageous to provide that the pickup device 34 also can move the gripper about further axes to displace items 3 from the conveyor belt 13 in the direction of the conveyor belt 11 and the containers 2 and to further provide that the gripper 40 is of the type which is capable of picking up a group of articles.

Figure 3:
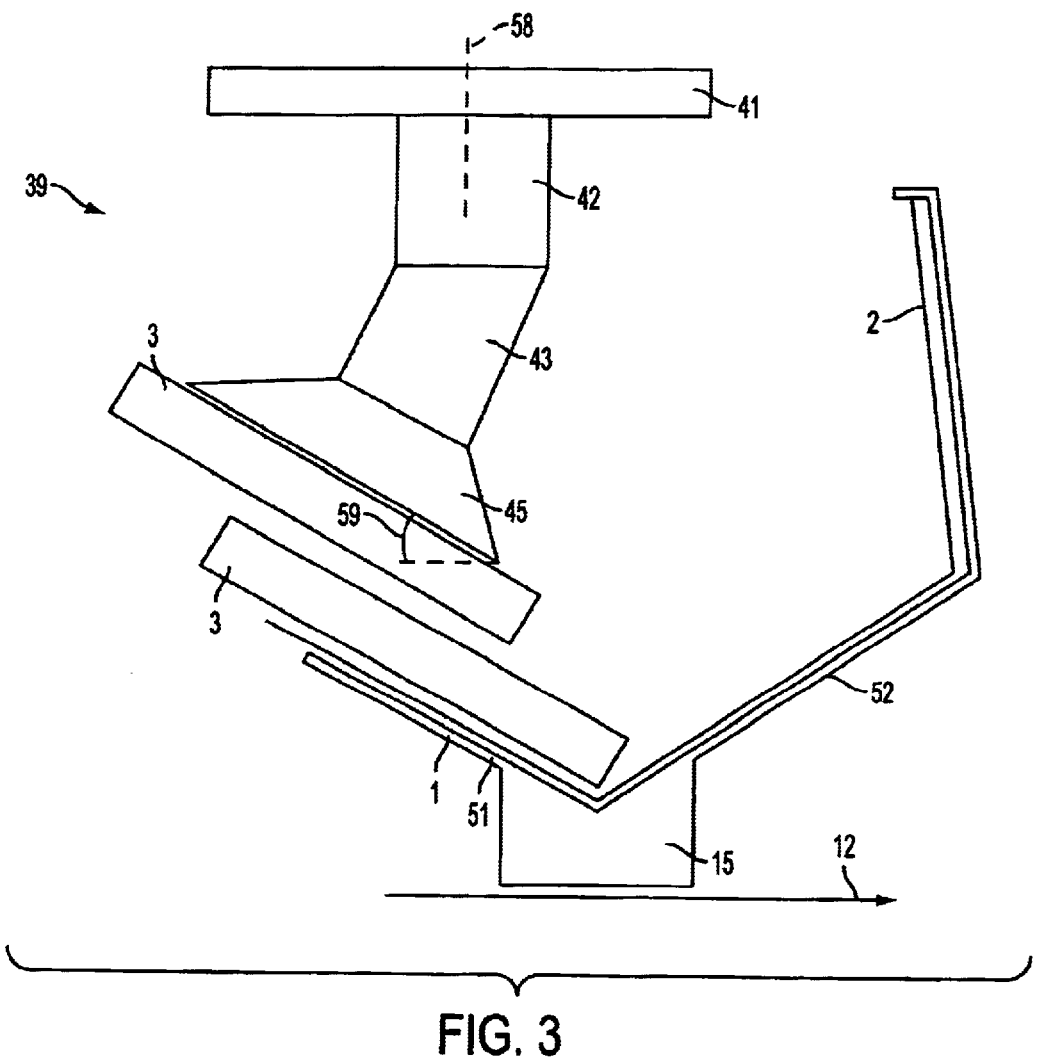
FIG. 3 is a schematic side elevational view of a gripper and a container carrier according to the invention in a second mode for edge-wise orienting the items relative to the container bottom.

FIG. 3 schematically shows the gripper 40 which is in a second mode 39 for depositing an item 3 into the container 2 in an edge-wise orientation relative to the container bottom.

It is thus seen that in cooperation with the angled positioning of the container 2 and dependent on the orientation of the arm 43 of the suction gripper 40 relative to the arm 42, items 3 can be deposited in a lying orientation either with respect to the container bottom (FIG. 2) or a container side (FIG. 3). In the alternative, the gripper 40 may have rigidly connected arms 42 and 43 for rotation about the vertical axis 58 shown in FIG. 3.

Thus, when subsequently the container 2 is uprighted from its inclined orientation in which it is positioned in the container carrier 1, an item 3 will assume either a flat-lying orientation or an edge-wise standing orientation with respect to the container bottom 25.

Figure 4A:
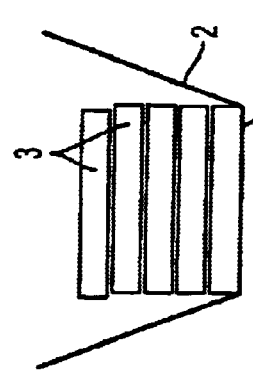
Figure 4B:
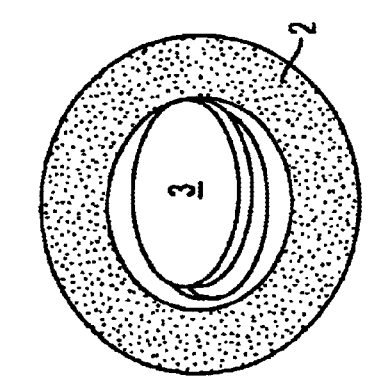
Figure 5A:
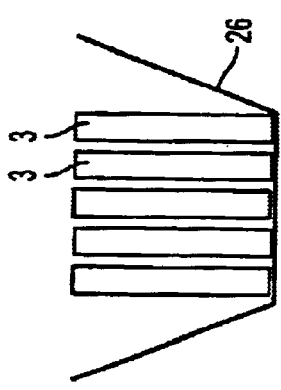
Figure 5B:
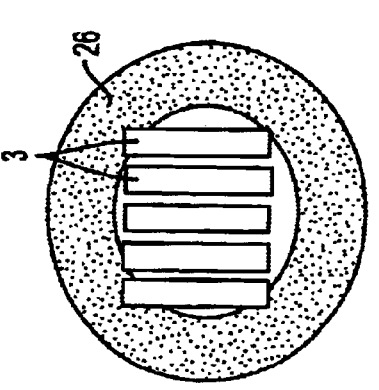
Figure 6A:
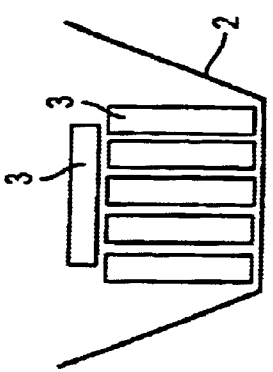
Figure 6B:
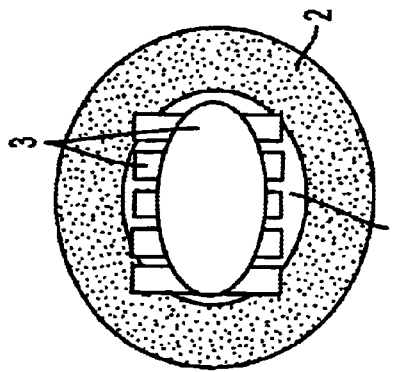
Figure 7A:
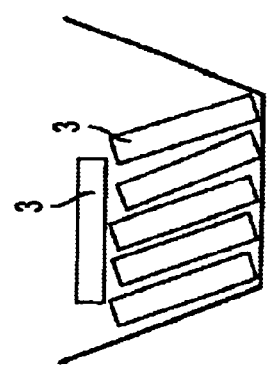
Figure 7B:
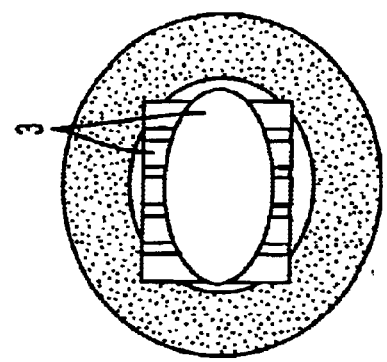

The above-described versatile item-depositing system makes possible various packaging patterns in the containers 2 as shown in FIGS. 4a–7a and 4b–7b. FIGS. 4a and 4b show five flat-lying, face-to-face stacked items 3, FIGS. 5a and 5b illustrate five side-by-side standing items 3, FIGS. 6a and 6b show five side-by-side standing items 3 supporting at the top a further item 3. As seen in FIGS. 7a, 7b, the items 3 may stand in a slightly oblique orientation, if the walls 26 are inclined. Further configurations, not illustrated in the figures, may comprise a lowermost flat-lying item on which standing items are positioned; these, in turn, may be covered at the top by a flat-lying item.

Instead of frustoconical containers 2, the apparatus comprising the gripper 40 may be used with any other type of containers having, for example, a quadratic or ovaloid bottom.

Figure 8C:
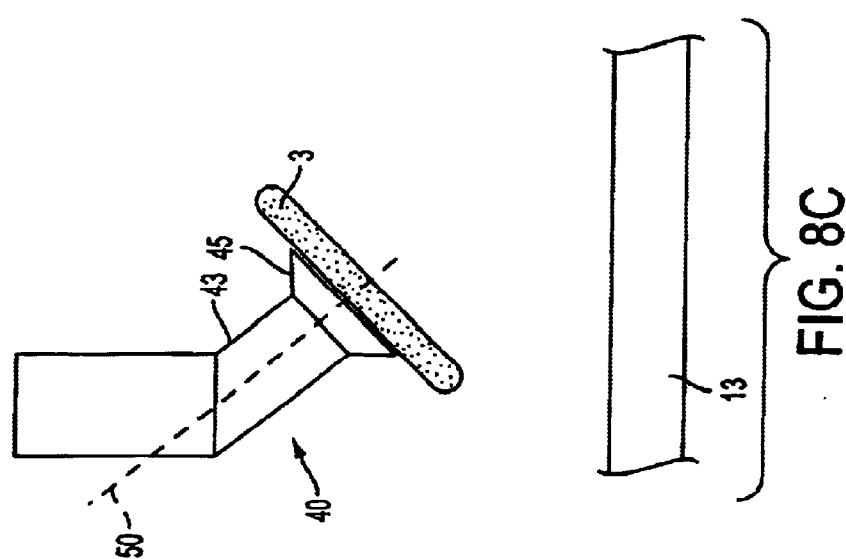
FIGS. 8a, 8b and 8c are schematic side elevational views of a suction gripper in three consecutive positions during grasping and lifting of an item.
Figure 8B:
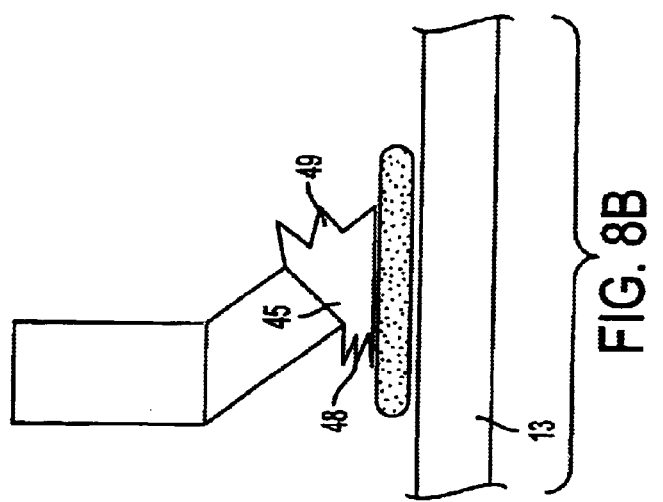
Figure 8A:
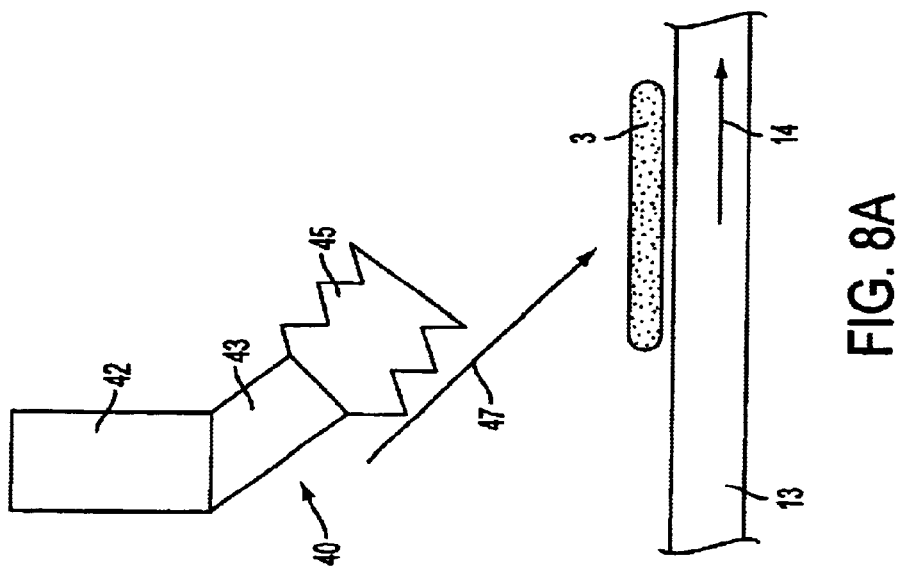

FIGS. 8a, 8b and 8c schematically show three consecutive operational positions of a suction gripper 40 during the pickup of an edible wafer 3. The suction gripper 40 has, under the arms 42 and 43, a bellows 45 which, as shown in FIG. 8a, is lowered in the direction of the arrow 47 toward the conveyor belt 13. FIG. 8b shows the suction gripper 40 as the bellows 45 is positioned on the item 3. During this occurrence the region 48 of the bellows 45 is compressed whereas the opposite-lying region 49 is expanded. Subsequently, the suction gripper 40 is, according to FIG. 8c, lifted off the conveyor belt 13 and thus the item 3, by virtue of the vacuum supplied by the suction gripper 40, adheres to the bellows 45 which is compressed to the maximum extent in its regions 48 and 49 so that the item 3 lies firmly against the suction gripper 40 perpendicularly to the longitudinal axis 50 of the arm 43.

It will be understood that the above description of the present invention is susceptible to various modifications, changes and adaptations, and the same are intended to be comprehended within the meaning and range of equivalents of the appended claims.

What is claimed is:

1. A method of introducing items in a container having a bottom and a side wall, comprising the following steps:
    (a) removing an item by a pickup device from a first conveyor;
    (b) providing, on a second conveyor, a container carrier having a first wall and a second wall arranged at an angle to one another and at an inclined angle to an advancing direction of said second conveyor;
    (c) selectively positioning the container in the container carrier so that the container bottom and the container side wall are oriented on the second conveyor at an oblique angle to said advancing direction of the second conveyor;
    (d) depositing the item by the pickup device in the container in a flat-lying orientation selectively either on the container bottom or on the container side wall; and
    (e) uprighting the container whereby items deposited in step (d) on the container bottom assume a flat-lying position on the container bottom and items deposited in step (d) on the container side wall assume an edge-wise standing position on the container bottom.

2. The method as defined in claim 1, wherein the second section extends in a horizontal plane.

3. An apparatus for forming a group of items in a container having a bottom and a side wall, the apparatus comprising
    (a) a first conveyor for advancing items positioned thereon, said first conveyor having a first direction of advance;
    (b) a second conveyor having a second direction of advance;
    (c) a plurality of container carriers mounted on said second conveyor, each said container carrier having a support means for holding and positioning the container, the support means having a first and a second wall arranged at an angle to one another and at an inclined angle to said second direction of advance such that the container is selectively arrangeable with the container bottom being supported by one of the first and the second wall of the support means and such that the container bottom and the container side wall are oriented at an inclined angle with respect to said second direction of advance;
    (d) pickup means for lifting items from said first conveyor, for transporting the items to said second conveyor and for depositing the items into a container held and positioned by one of said container carriers; and
    (e) control means for controlling motions of said pickup means to selectively deposit items in a flat-lying orientation either on the container bottom or on the container side wall of the container held and positioned by one of said container carriers, whereby after uprighting the containers subsequent to their charging with items, each item in the container is either in a flat-lying orientation or in an edge-wise standing orientation with respect to the container bottom.

4. The apparatus as defined in claim 3, wherein said pickup means includes a suction head having
    (a) a suction opening adapted to be covered by a surface of an item to be transported by the pickup means; and
    (b) a deformable part for allowing a change in orientation of said suction opening.

5. The apparatus as defined in claim 3, wherein said pickup means includes
    (a) a holding base;
    (b) a first arm mounted on said holding base;
    (c) a second arm pivotally secured to said first arm; and
    (d) a suction head secured to said second arm; said suction head having a first orientation at a first angle formed between said first and second arms and a second orientation at a second angle formed between said first and second arms; in said first orientation said suction head deposits an item in a flat-lying orientation on a container bottom and in said second orientation said suction head deposits an item in a flat-lying orientation on a container side wall of a container held and positioned by one of said container carriers.

6. The apparatus as defined in claim 5, wherein said first and second angles each is approximately 45°, whereby said first and second orientations of said suction head are offset approximately 90° from one another.

7. The apparatus as defined in claim 3, wherein said pickup means includes
    (a) a holding base;
    (b) a first arm mounted on said holding base and having a longitudinal axis of rotation;
    (c) a second arm affixed to said first arm at an inclined angle to said longitudinal axis of rotation; and
    (d) a suction head secured to said second arm; said suction head having a first orientation and a second orientation reached upon a 180° rotation of said first arm, said second arm and said suction head as a unit about said longitudinal axis of rotation; in said first orientation said suction head deposits an item in a flat-lying orientation on a container bottom and in said second orientation said suction head deposits an item in a flat-lying orientation on a container side wall of a container held and positioned by one of said container carriers.

8. The apparatus as defined in claim 3, wherein said container carriers each have a length dimension oriented transversely to said second direction of advance.

9. The apparatus as defined in claim 3, wherein said container carriers are uniformly spaced on said second conveyor in said second direction of advance.

10. The apparatus as defined in claim 3, further comprising sensor means for determining orientations of the items on said first conveyor; said sensor means being connected to said control means for applying sensor signals to said control means to effect deposition of items by said pickup means in a predetermined orientation in a predetermined container.

11. The apparatus as defined in claim 10, wherein said sensor means comprises a camera.

12. The apparatus as defined in claim 3, wherein the second section extends in a horizontal plane.

* * * * *